US006184605B1

(12) United States Patent
Kim (10) Patent No.: US 6,184,605 B1
(45) Date of Patent: Feb. 6, 2001

(54) THREE POLE FORCED PERMANENT MAGNET ROTOR WITH DC TWISTER

(76) Inventor: Nung-Soo P. Kim, 602-55 Huntingdale Boulevard, Scarborough, Ontario (CA), M1W 2N9

( * ) Notice: Under 35 U.S.C. 154(b), the term of this patent shall be extended for 0 days.

(21) Appl. No.: 09/331,357

(22) PCT Filed: Jan. 12, 1998

(86) PCT No.: PCT/CA98/00014

§ 371 Date: Jun. 18, 1999

§ 102(e) Date: Jun. 18, 1999

(87) PCT Pub. No.: WO98/34333

PCT Pub. Date: Aug. 6, 1998

(30) Foreign Application Priority Data

Jan. 30, 1997 (CA) .................................................. 2196340

(51) Int. Cl.⁷ .................................................. H02K 21/12
(52) U.S. Cl. .................................................. 310/156; 310/86
(58) Field of Search .................................. 310/156, 154, 310/152, 181, 103, 80, 46; 318/41

(56) References Cited

U.S. PATENT DOCUMENTS

| | | | |
|---|---|---|---|
| 4,151,431 | * 4/1979 | Johnson | 310/12 |
| 4,571,528 | * 2/1986 | McGee et al. | 318/138 |
| 4,754,207 | * 6/1988 | Heidelberg et al. | 318/254 |
| 5,415,140 | * 5/1995 | Rigazzi | 123/197.1 |
| 5,585,680 | * 12/1996 | Tsoffka | 310/49 R |
| 5,606,230 | * 2/1997 | Drury et al. | 318/41 |

FOREIGN PATENT DOCUMENTS

| | | |
|---|---|---|
| 815710 | * 9/1974 | (BE) . |
| 2946340A | * 5/1980 | (DE) . |
| 3332254A1 | * 4/1985 | (DE) . |
| 543031 A1 | * 5/1993 | (EP) . |
| 4-04317555 | * 11/1992 | (JP) . |
| 4-04317558 | * 11/1992 | (JP) . |
| 405176563 | * 7/1993 | (JP) . |
| 91/04603 | * 4/1991 | (WO) . |

* cited by examiner

Primary Examiner—Nestor Ramirez
Assistant Examiner—Joseph Waks
(74) Attorney, Agent, or Firm—David W. Wong (57) ABSTRACT

This device converts the intrinsic magnetic force of permanent magnets into a useful output. The three-pole permanent magnets configuration comprises of two elongated bar magnets (1,2) having two opposite magnetic polarities divided by a longitudinal plane. One magnet (1) is referred to as the movable magnet and the other magnet (2) is referred to as the stationary magnet and is located juxtaposed and perpendicular to a broad side surface of the movable magnet. The interaction of the intrinsic magnetic forces of the two magnets (1,2) results in a torque forcing the movable magnet to move in its longitudinal direction (37) relative to the stationary magnet. A plurality of such three-pole permanent magnets configurations are provided around the periphery of a rotary wheel (8) to provide a rotary torque output.

8 Claims, 9 Drawing Sheets

THREE POLE FORCED PERMANENT MAGNET ROTOR WITH DC TWISTER

BACKGROUND OF THE INVENTION

This invention relates to a magnetic device for converting the intrinsic magnetic force of permanent magnets into a useful torque. The unit torque is derived basically from a three-pole permanent magnets configuration consisting of two elongated bar magnets each having opposite magnetic polarities on two broad side surfaces divided by a longitudinal plane; one of the bar magnet is referred to as the movable magnet and the other bar magnet is referred to as the stationary magnet and located juxtaposed and perpendicular to a broad side surface of the first bar magnet having a single magnetic polarity. A torque is developed by the interaction between the north and south polarities at the end of the stationary bar magnet facing the single magnetic polarity of the broad side surface of the movable bar magnet to cause the movable bar magnet to move in its longitudinal direction relative to the stationary bar magnet. A plurality of such three-pole permanent magnets configurations may be provided around the periphery of a rotary wheel to provide a continuous rotary torque. Such configuration of converting intrinsic magnet force of permanent magnets to useful torque output has not heretofore been achieved.

SUMMARY OF THE INVENTION

It is a principal object of the present invention to provide a unique three-pole permanent magnets configuration for converting the intrinsic magnet forces of permanent magnets into useful output torque.

It is another object of the present invention to provide a multi-pole permanent magnets configuration consisting of a plurality of three-pole permanent magnets configuration to provide a large output torque.

It is yet another object of the present invention to provide a device which is operative with a low electrical power to provide a relatively large output torque.

BRIEF DESCRIPTION OF THE DRAWINGS:

Other objects and advantages of the present invention will become apparent from the following description with reference to the drawings in which.

DETAILED DESCRIPTION OF THE PREFERRED EMBODIMENTS

With reference to the drawings

Figure 1:
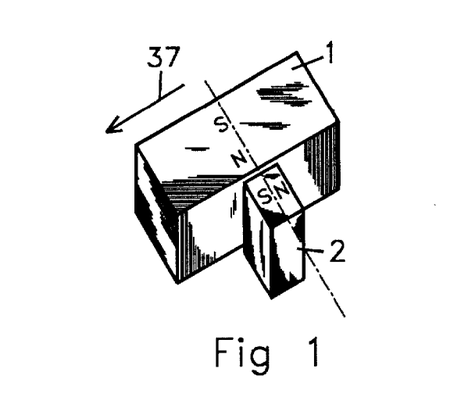
FIG. 1 is a perspective elevation view illustrating a single three-pole permanent magnet forced mechanism.

FIG. 1 shows the location of two permanent magnets 1 and 2 to form a single three-pole permanent magnet force placement mechanism in which each magnet has a north pole and south pole. The two poles of the permanent magnet 2 are located substantially perpendicular to the single pole of the permanent magnet 1, the reacting magnetic force between the two magnets urges the magnet 1 to move in the direction of the arrow 37 when the permanent magnet 2 is fixed in position. This mechanism provides the basic structure of the device of the present invention.

Figure 2:
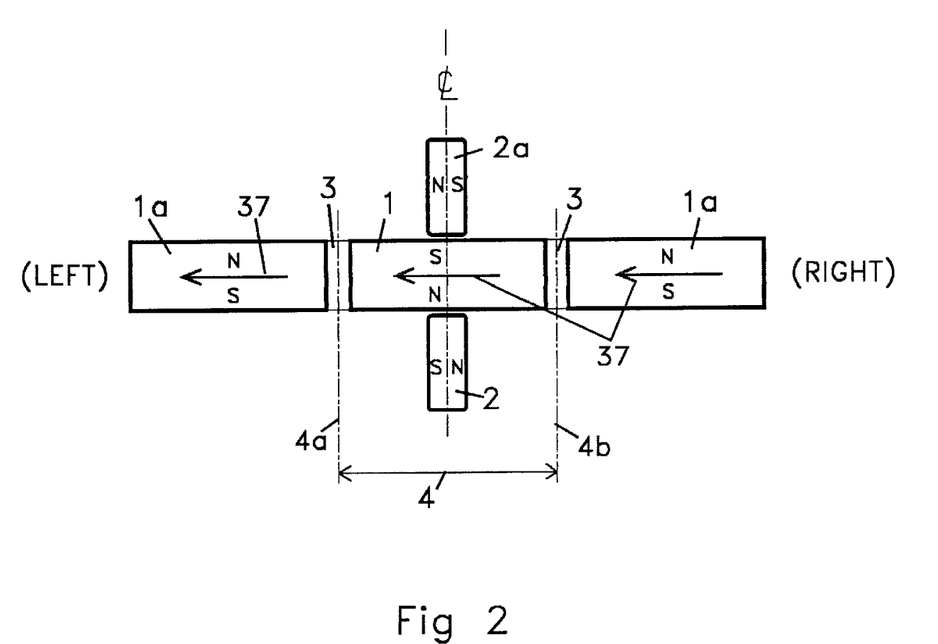
FIG. 2 is a schematic diagram illustrating a double (two-way) three-pole permanent magnet force with the relationship of neighboring magnets.

FIG. 2 shows, according to the present invention, a two-way, or hereinafter referred to as two-phase three-pole permanent magnet and its neighboring magnets. There are five magnetic poles reacting with one another on each side, i.e. each phase of the neighboring magnets 1 and 1a, such that the total composition has two phases and ten magnetic poles reacting with one another. The magnetic repulsion and attraction composition forces between the various magnetic poles are activated and in motion in an active area 4 which begins at 4a and ends at 4b. When magnets 2 and 2a are held in a fixed position, magnet 1 and 1a are forced to move towards the direction of the arrow 37. A gap 3 forms an extension of the active area of wheel magnets 1 and 1a. This gap can be greater or equal to zero.

The total composition force of a unit is the sum of the repulsion and attraction forces between the wheel magnet 1, and the station magnets, 2 and 2a, plus the sum of the repulsion and attraction forces between its two neighboring wheel magnets 1a which are located on both the left and right sides respectively of the wheel magnet 1, and the station magnets, 2 and 2a.

Figure 3:
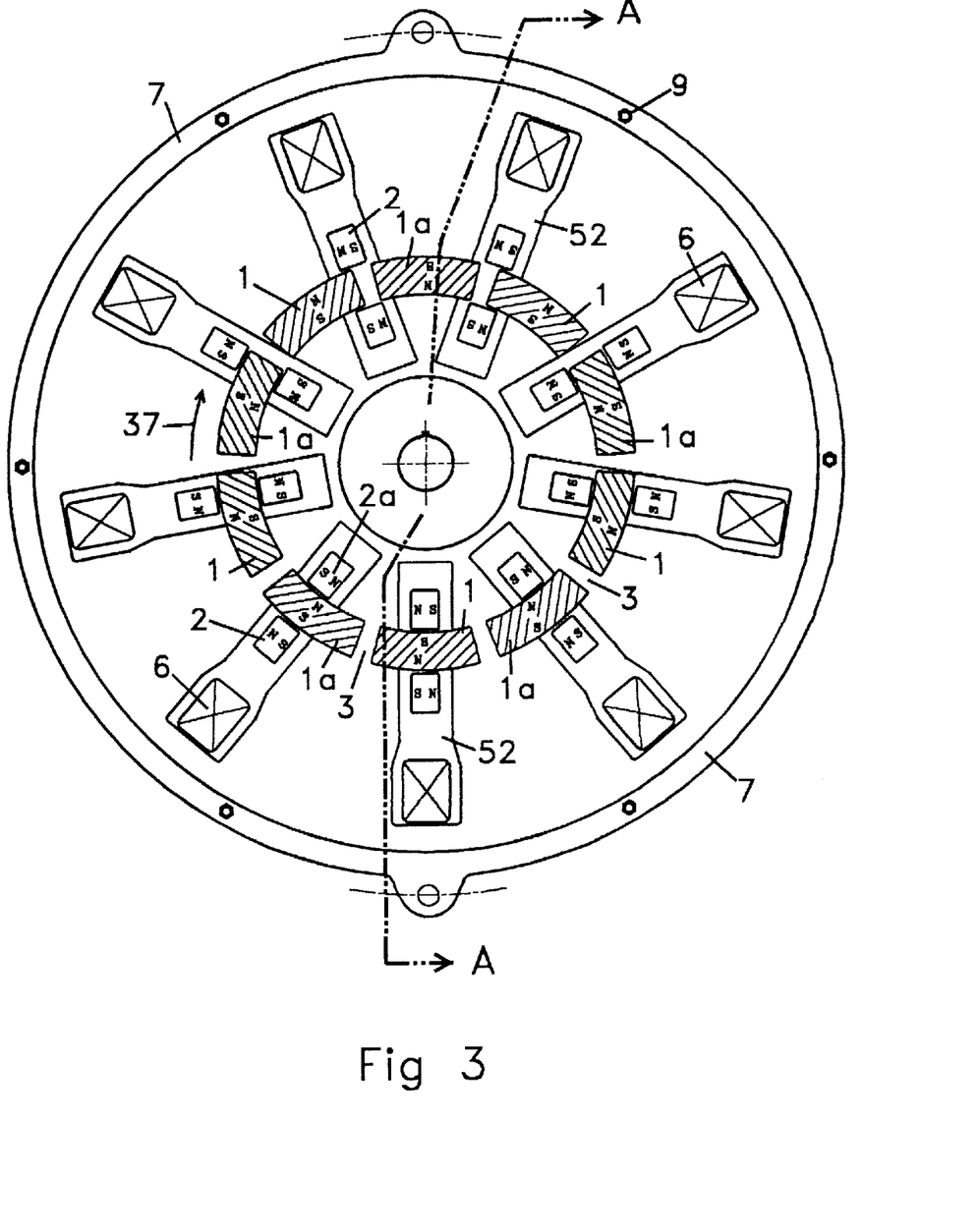
FIG. 3 is a schematic diagram showing an example of the location of wheel magnets and station magnets on a rotary wheel of the present invention.
Figure 4:
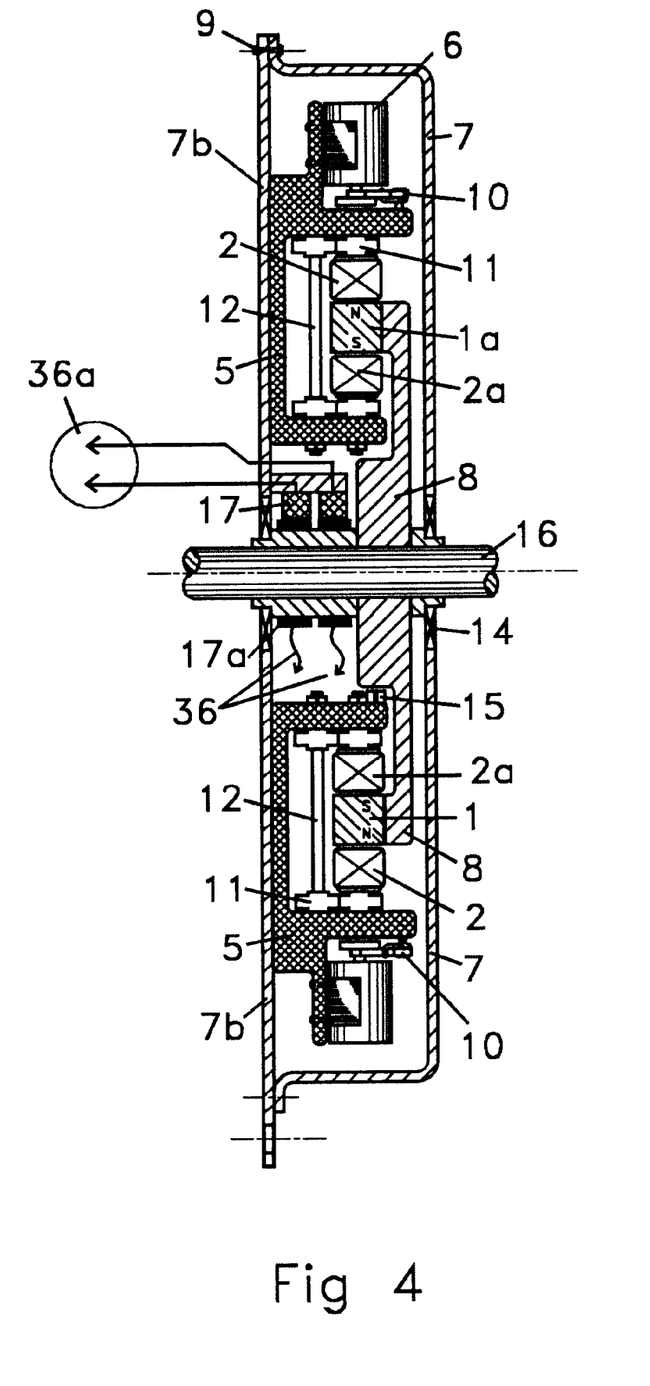
FIG. 4 is a cross-section view along section line A—A of FIG. 3.

An exemplary embodiment of the present invention is shown in FIGS. 3 and 4, which has an even number, greater than or equal to four, depending on the size of the rotary wheel on which the wheel magnets are mounted, of wheel magnet 1 and 1a, mounted in a circular ring fashion on the surface of a rotary wheel 8 and are located radially from the center of the rotary wheel. The number of wheel magnet 1 equals to the number of wheel magnet 1a; and the polarities of each wheel magnet 1 and the associated wheel magnet 1a are in opposition at each unit location or unit station 52 of the rotary wheel. All wheel magnets 1 and all wheel magnets 1a are located equidistant from corresponding neighboring wheel magnets 1 and 1a respectively. Each unit station 52 contains station magnets 2 and 2a which provide the two-way three-pole permanent magnetic forces. The polarities of the station magnet 2a are opposite to those of the station magnet 2 facing towards the wheel magnet 1. Each DC twister 6 is coupled to one unit of a reverse and overspin protector 10, electrical contact arms 15 adapted for conducting an input voltage to the DC twister, two sets of spur gear 11, and rotary shafts 12, 19, and 19a which are mounted to a station frame 5. The unit station 52 is mounted onto an enclosure 7b of a fixed main frame. The total number of unit stations 52 placed on the enclosure 7b is an odd number which is less than the number of wheel magnets 1 and 1a provided. All unit stations 52 are placed at equal distances from one another on the surface of the rotary wheel 8 around the circular ring at which the wheel magnets 1 and 1a are located.

A rotary wheel 8 is mounted rotatably to a rotary shaft 16. The electrical input for activating the DC twister 6 is provided, for example, by a mechanical switching assembly consisting of an electrical conductor 17a mounted on the shaft 16 and electrical conducting members 17 mounted to the enclosure 7b. and bearings 14 are provided between the shaft 16 and the enclosure 7 and 7b. The electrical current for operating the DC twister 6 flows from an electrical source 36a through electrical contact points 21 and 21a (see FIG. 7) located on the rotary wheel 8 and electrical contact arms 15 mounted on the station frame 5. The electrical contact points 21 and 21a come in contact with the electrical contact arms 15 when the rotary wheel 8 is rotating.

Figure 5:
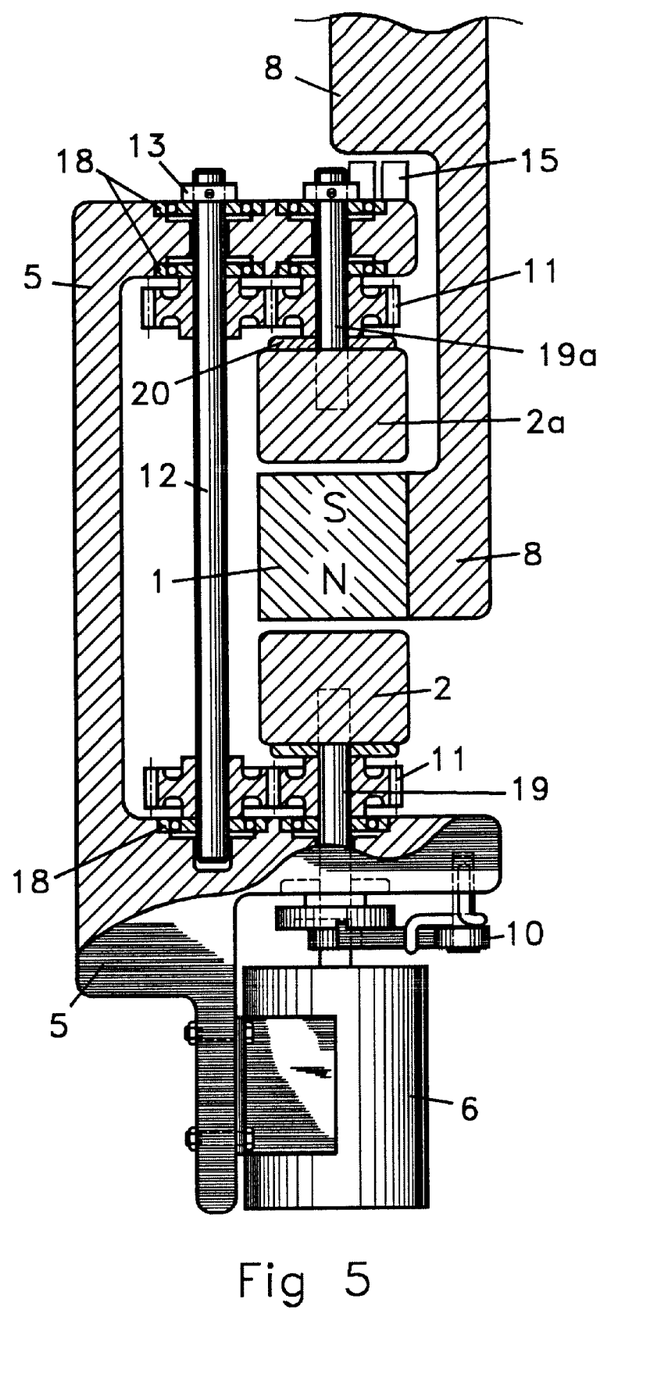
FIG. 5 is an isolated partial sectional side elevation view of a two-phase (two-way) station.

As shown in FIG. 5, at a unit station 52, a shaft 19 is coupled directly to the DC twister 6, the cam gear 10 and the station magnet 2. Similarly, a shaft 19a is coupled to the station magnet 2a.

Station magnets 2 and 2a, rotate simultaneously in the same direction as a shaft 12 and a spur gear 11 such that the polarities of these magnets 2 and 2a are always in opposition. As shown, the position of the electrical contact arm 15 is located at the position during the activation at which the DC twister is connected to the DC power source. At such activation, the DC twister 6 will rotate the station magnets through 180 degrees, or close to 180 degrees. With such rotation, the polarities of station magnets 2 and 2a will each change upon such rotation. The reverse and overspin protecting cam gear 10 protect the station magnets 2 and 2a against rotating in the reverse and overspinning beyond 180 degrees. The position of the cam gear may be manually adjusted according to the rotating capability of the twister. The total number of gears is greater than or equal to 2.

Figure 6:
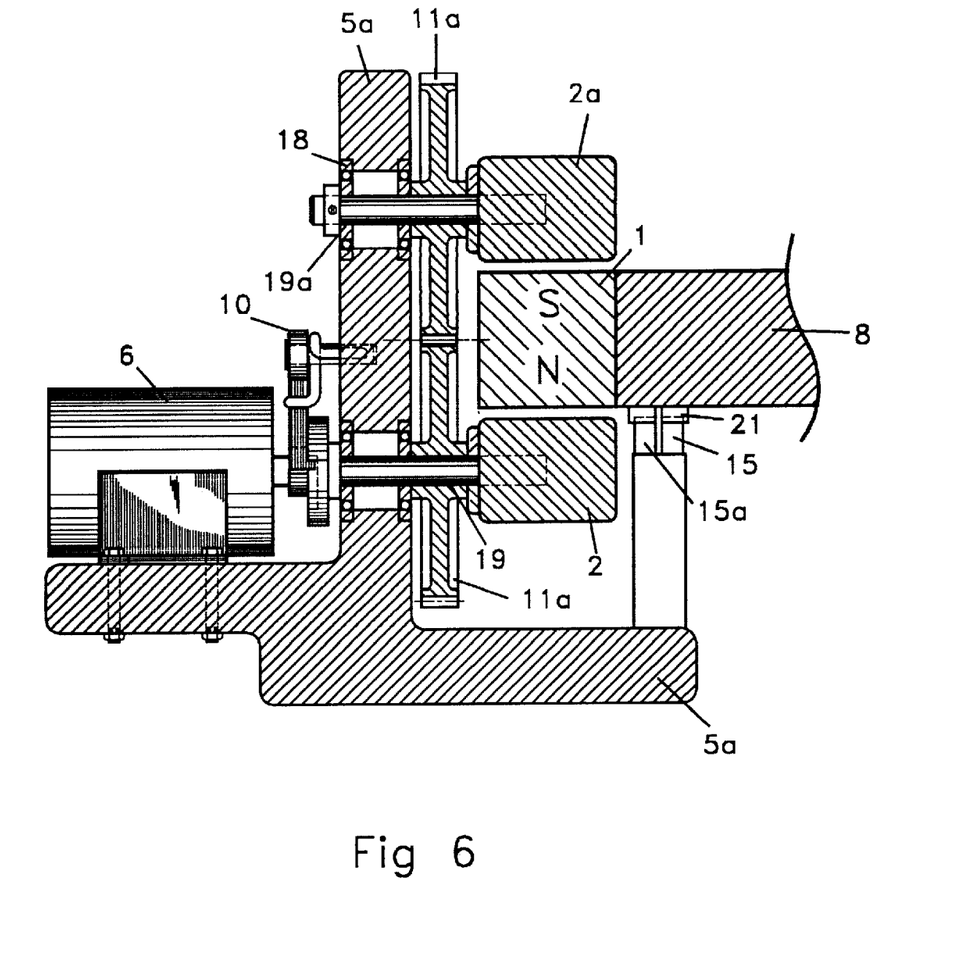
FIG. 6 is an isolated partial sectional side elevation view of another embodiment in which the station magnets are located respectively above and below the associated wheel magnet.

FIG. 6 shows an alternative embodiment in which the magnet 2 and 2a are located respectively below and above the associated wheel magnet 1 to provide the same desired result.

Figure 7:
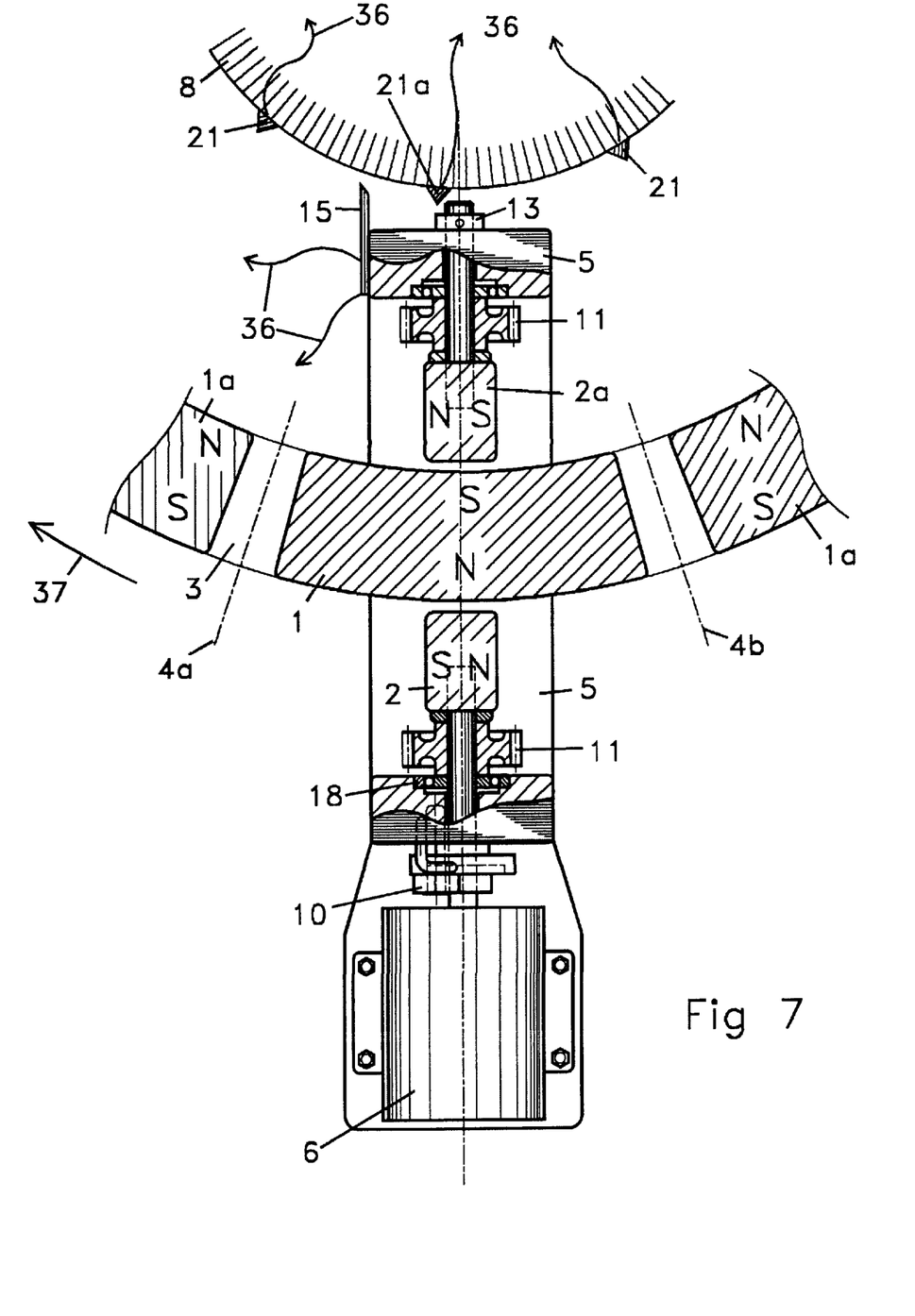
FIG. 7 is an isolated partial sectional side elevation view of a station and a part of the rotary wheel according to the present invention.

As best shown in FIG. 7, electrical contact points 21 and 21a are located on the rotary wheel 8. A specific location is required when the center-line (geometric neutral plane) of station magnets 2 and 2a reaches 4a or 4b (turning point-see FIG. 2). Electrical contact points 21 and 21a on the rotary wheel 8, and electrical contact arms 15 at the unit station 52 must connect with each other until the DC twister has fully rotated the station magnet for 180 degrees or close to 180 degrees. Electrical contact points 21 and 21a provide current of different polarities to the DC twister, and these polarities change alternately as shown in the wiring diagram FIG. 12. The number of electrical contact points 21 is equal to the number of wheel magnet 1, and the number of the electrical contact points 21a is equal to the number of wheel magnet 1a. The electrical contact arm 15 is directly connected to the DC twister. The active area (see FIG. 2) represents the wheel as it is forced to rotate in the direction of the arrow 37. A shaft retainer 13 is provided at the end of each rotary shaft.

Figure 8:
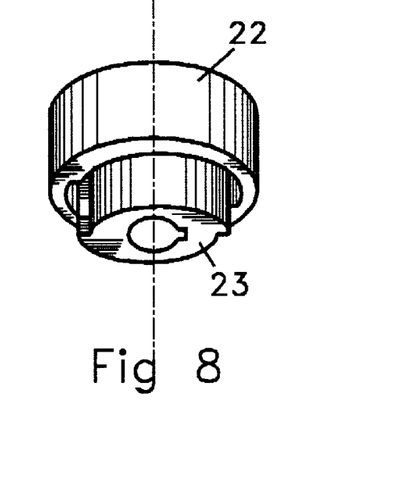
FIG. 8 is a perspective elevation view of the reverse and overspin protector cam gear.
Figure 9:
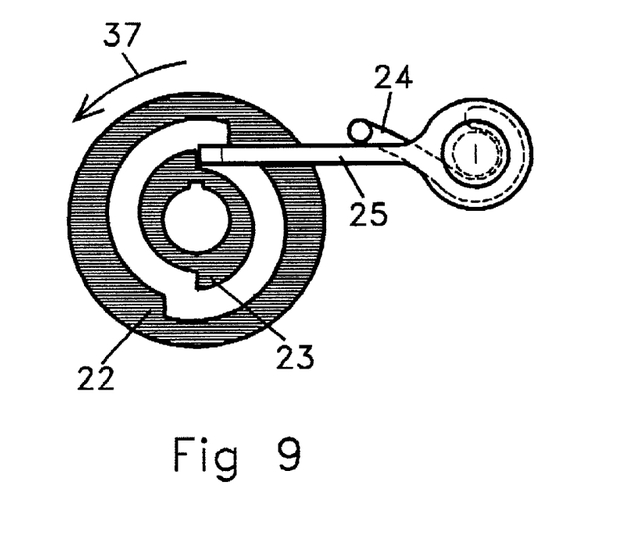
FIG. 9 is a front elevation view of the reverse and overspin protector cam gear.
Figures 10, 11:
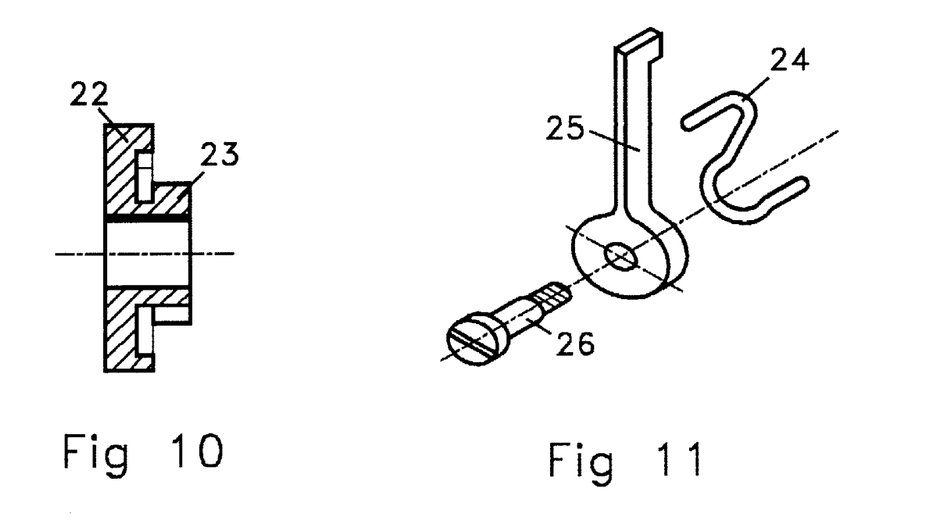
FIG. 10 is a sectional side elevation view of the reverse and overspin protector cam gear.
FIG. 11 is a perspective elevation view of the cam gear key and spring according to the present invention.

FIG. 8 shows the reverse and overspin protector cam gear. An overspin protection gear 22 and a reverse spin protection gear 23 are provided, which may be manually adjusted on the shaft according to a desired requirement. The total number of reverse spin protection gear 23 is greater than or equal to 2. As the cam gear rotates in the direction of the arrow 37, a spring 24 constantly forces a lock key 25 down as shown in FIG. 9. A bolt 26 is used to secure the lock key 25 to the unit station 52 as shown in FIG. 11.

Figure 12:
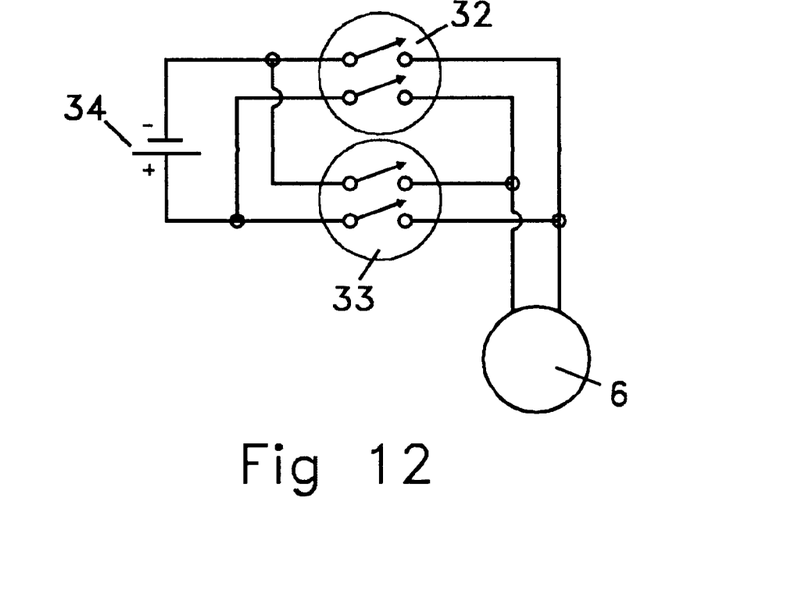
FIG. 12 is an electrical wiring diagram for the DC twister and its activating switch.

FIG. 12 is a wiring diagram which shows the wiring sequence of an electrical source 34 for operating the DC twister 6. Switches 32 and 33 represent the electrical contact points materials 21 and 21a and the electrical contact arm 15.

Figure 13:
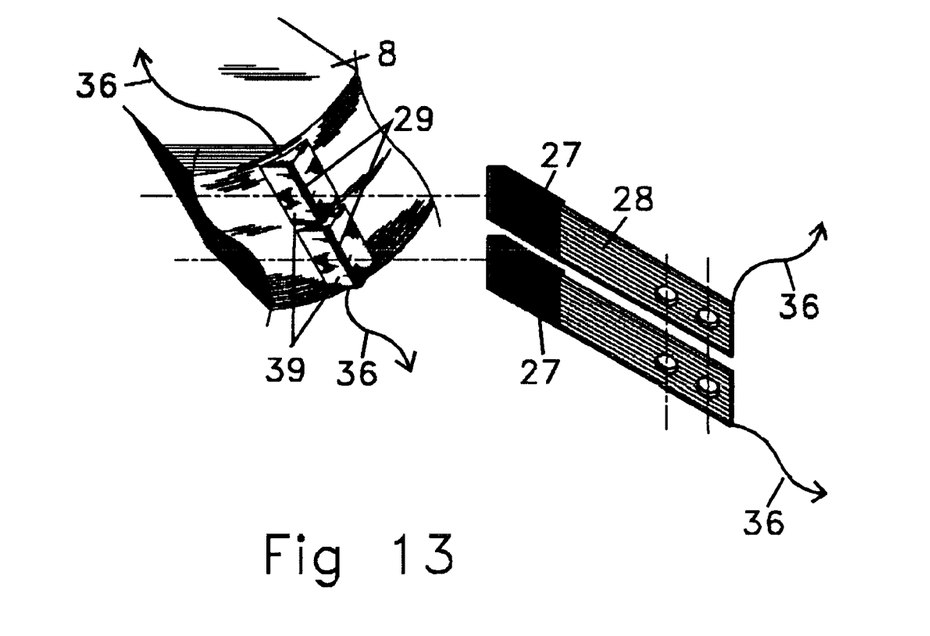
FIG. 13 is an isolated elevation of the switch conductor.

FIG. 13 shows the detailed construction of the switches. Electrical current flows in the direction of the arrow 36, and electrical conducting material 39 represents electrical contact points 21 and 21a. Electrical conducting members 27 represent the electrical contact arm 15. Each electrical conducting member 27 is attached to a flexible electrical conducting spring 28 which is, in turn, mounted onto the unit station 52. An electrical insulator 29 is located on the top of the electrical contact point 21 to provide a time delay between the two sides of the contact point successively coming in contact with the electrical conducting members 27 during operation. An insulator having a wider width will result in a longer time delay period.

Alternatively, it will be appreciated by those skilled in the art that the entire mechanical assembly for operating the DC twister may be provided by an electronic switching means.

Figure 14:
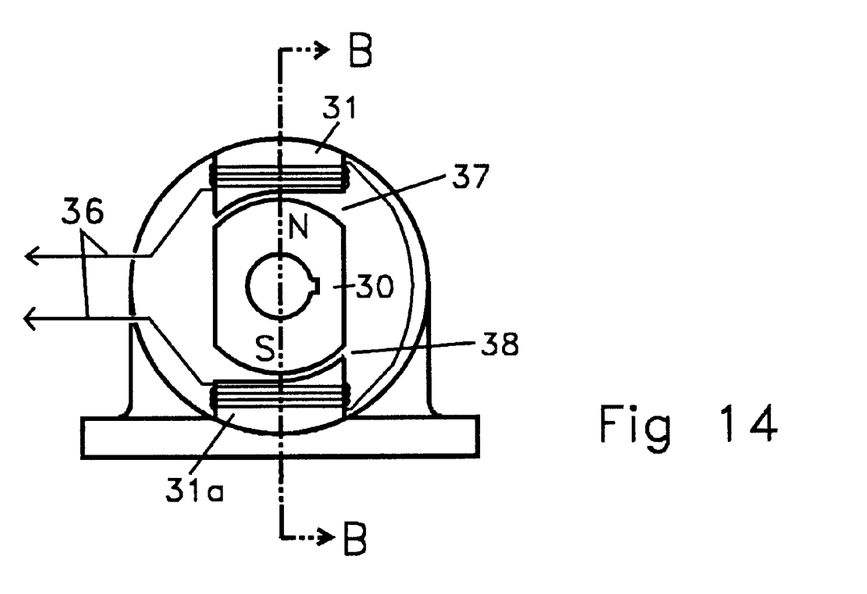
FIG. 14 is an elevation side view of the DC (Direct Current) twister.
Figure 15:
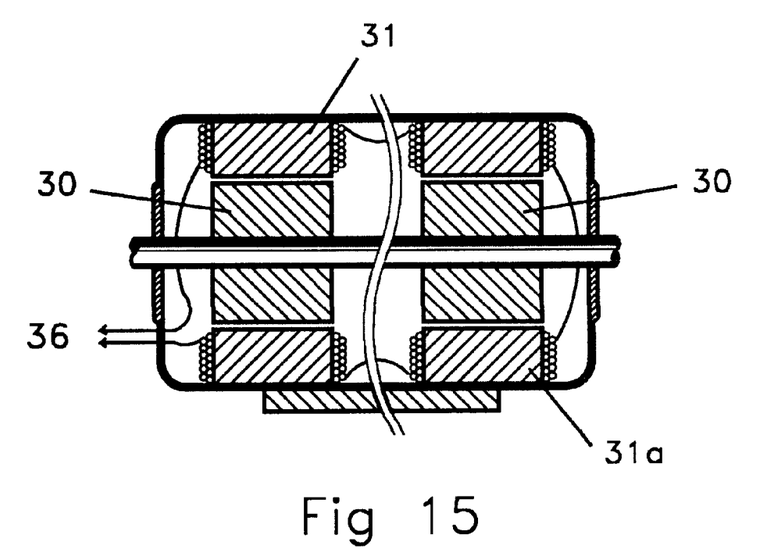
FIG. 15 is a sectional side elevation view along section line B—B of the DC twister of FIG. 14.

The construction of the twister 6 is best shown in FIGS. 14 and 15. It resembles a common electric motor; however, the twister can only rotate precisely 180 degrees, or close to 180 degrees, when it is activated. The spacing between an iron-core electromagnet 31 and a permanent magnet rotor 30 in the twister is narrow at one end 38 and wider at the other end 37. This causes the permanent magnet rotor 30 to rotate in one specific direction only; in this case, it will rotate in the clockwise direction (i.e. the direction of the wider end as it begins to narrow corresponding with the direction of rotation of the permanent magnet rotor 30). The current flows in the direction of the arrow 36 (refer to the wiring diagram in FIG. 12). The twister must have enough power to drive station magnets 2 and 2a. A twister provided with a plurality of permanent magnet rotor 30 and iron-core electromagnets 31 and 31a is shown in FIG. 15. The plurality of rotors 30 are mounted on the same shaft such that it causes the smaller diameter of the rotor to spin faster than that of the larger diameter. Such twister may be used to provided a high power if required.

The rotary wheel 8 is rotated by the three-pole permanent magnetic force provided by the neighboring wheel magnets and the station magnets (1 phase 5 poles or 2 phase 10 poles). Station magnets 2 and 2a is rotated 180 degrees, or close to 180 degrees, by the twister 6. All activating electrical switches for the twisters are individually operating; one unit at a time. Therefore, electricity is continuously required for only a single unit of DC twister to obtain the attraction and repulsion forces of the wheel magnets on the rotary wheel and station magnets.

To obtain a higher output torque or power, an increasing number and/or larger and stronger wheel magnets and station magnets can be used, depending on the size of the rotary wheel on which these magnets are mounted.

The total moment force on the rotary wheel may be expressed in the following formula without consideration of friction and the magnetic fields of the station magnets are limited to the length of a wheel magnet:

$$TF=R(S1+S2+S3+\ldots Sn-1)-\{R(Sn-P)+EM1\}$$

in which: TF is the total moment force on the rotary wheel.
R is the radius of the rotary wheel.
S1 is the first station total composition force over wheel magnets.
Sn is the last station total composition force when the station magnets are rotating.
P is the external magnetic force.
EM1 is (if applicable) the rotating net force for the twister.

A larger unit of rotary wheel is able to produce its own electricity with a sub unit generator which recycles (Alternate) DC power to rotate the twister. A very low input electricity results in a large output torque. This process is the main purpose of this invention.

This rotary wheel will rotate when it is applied with EM1 (Alternated Electric force for twister) and when TF is positive (greater than 0)

Statement of three-pole motion:
The motion of three-pole attraction and repulsion magnetic forces are in the same direction at the same time.
There are two types of forces acting on the rotary wheel:
1. External—The station magnets are rotated by an external electrical force provided by the twister. Station magnets are drivers and wheel magnets are followers.
2. Internal—Applicable magnetic composition forces, described as three-pole, five-pole, or ten-pole, are the inherent internal magnetic forces possessed by all the magnets. External electricity activates the twister which rotates the station magnets 180 degrees at a time. As the station magnets rotate, their magnetic polarities are constantly varying alternately from north to south, or south to north. The turning point of rotation of the station magnets is shown in FIG. 2, illustrated by line 4a or 4b. These lines occur between two wheel magnets. Within the active area (FIGS. 2, 4), repulsion and attraction composition forces are active and in motion. When the station magnets are rotating, they provide the external forces for rotating the rotary wheel in a specific direction. When the polarities of the station magnets change, at lines 4a or 4b, the three-pole structure is established. As soon as this structure has been established, the internal composition forces begin until the next turning point (FIG. 2, active area 4). The repetition of this cycle makes the rotary wheel rotating continuously.

What I claim:

1. A multi-pole forced permanent magnet rotary device comprising:
   a rotary wheel having a center therein provided with a rotary shaft,
   a plurality of an even number of wheel magnets mounted on a surface of said rotary wheel and located in an even fashion around a circular ring relative to said rotary shaft neighboring wheel magnets having different magnetic poles facing said shaft,
   a plurality of odd number of station magnets adapted to locate juxtaposed to one side of said wheel magnets, said station magnets having different magnetic poles therein located adjacent to two ends of respective neighboring wheel magnets, and each one of said station magnets being rotatable relative to an axis substantially perpendicular to a neighboring wheel magnet, and neighboring station magnets having same magnetic poles facing one another,
   a second plurality of an odd number station magnets mounted juxtaposed to a second side of said wheel magnets, said second side being located directly opposite to said one side, and said second plurality of said odd number station magnets having opposite magnetic poles on two sides therein opposite to said magnetic poles on the two sides of said plurality of said odd number station magnets located on said one side, and each one of said second plurality of said odd number station magnets being rotatable relative to said axis perpendicular to a neighboring wheel magnet,
   each of said station magnets located on said one side of a wheel magnet being rotatable by a first twister member, and each of said station magnets located on said second side of a wheel magnet being rotatable by a second twister member, said first twister member and second twister member being operative to rotate each of said station magnets located on said one side and each of said station magnets located in said second side simultaneously through 180 degrees.

2. A multi-pole forced permanent magnet rotary device according to claim 1 wherein said station magnets and associated twister members are mounted on a stationary frame located juxtaposed to said rotary wheel.

3. A multi-pole forced permanent magnet rotary device according to claim 2 including a reverse and overspin protector cam gear provided between each one of said station magnets and said associated twister member and adapted to restrict rotation of said station magnet through 180 degree when said associated twister member is activated.

4. A multi-pole forced permanent magnet rotary device according to claim 3 including a plurality of electrical contact points mounted on said shaft of said rotary wheel, and a plurality of electrical contact arms mounted on said stationary frame, said electrical contact points and said electrical contact arms being adapted to contact one another to conduct electrical power for activating selected twister members.

5. A multi-pole forced permanent magnet rotary device according to claim 4 including an electrical insulator member disposed on top each one of said electrical contact points and adapted to provide a time delay for activating said selected twister members.

6. A multi-pole forced permanent magnet rotary device according to claim 5 wherein each of said twister member includes an iron-core electromagnet and a permanent magnet rotor.

7. A multi-pole forced permanent magnet rotary device according to claim 6 wherein said twister members are operative by electronic switching circuit means.

8. A multi-pole forced permanent magnet rotary device according to claim 7 wherein said station magnets are located below and above respective associated neighboring wheel magnets.

* * * * *